(12) United States Patent
Ho et al.

(10) Patent No.: US 9,824,055 B2
(45) Date of Patent: Nov. 21, 2017

(54) CONTROL METHOD APPLIED TO OPERATING-MODE FINITE-STATE-MACHINE AND COMPUTER READABLE MEDIA

(71) Applicant: Realtek Semiconductor Corp., HsinChu (TW)

(72) Inventors: Hsuan-Ting Ho, Taichung (TW); Liang-Wei Huang, Hsinchu (TW); Ching-Yao Su, Taichung (TW); Sheng-Fu Chuang, Taichung (TW)

(73) Assignee: Realtek Semiconductor Corp., HsinChu (TW)

( * ) Notice: Subject to any disclaimer, the term of this patent is extended or adjusted under 35 U.S.C. 154(b) by 260 days.

(21) Appl. No.: 14/645,438

(22) Filed: Mar. 12, 2015

(65) Prior Publication Data
US 2016/0132455 A1    May 12, 2016

(30) Foreign Application Priority Data
Nov. 7, 2014    (TW) .............................. 103138703 A

(51) Int. Cl.
G06F 1/32    (2006.01)
G06F 13/42    (2006.01)

(52) U.S. Cl.
CPC ........ *G06F 13/4208* (2013.01); *G06F 1/3296* (2013.01)

(58) Field of Classification Search
None
See application file for complete search history.

(56) References Cited

U.S. PATENT DOCUMENTS 8,600,231 B2 *   12/2013   Skubic ................ H04B 10/272
                                                            398/38

FOREIGN PATENT DOCUMENTS

CN         102402272 A    4/2012
CN         102457851 A    5/2012

\* cited by examiner

*Primary Examiner* — Cheng-Yuan Tseng
(74) *Attorney, Agent, or Firm* — Winston Hsu

(57) ABSTRACT

A control method applied to an Operating-Mode Finite-State-Machine (OPFSM) arranged for deciding a behavior of a first port of an apparatus includes: controlling the OPFSM to enter a second local state from a first local state and controlling the first port to send a signal with a wakeup pattern to a link partner of the first port when the state of the OPFSM is the first local state, and a wakeup request bit is a first local value.

20 Claims, 7 Drawing Sheets

CONTROL METHOD APPLIED TO OPERATING-MODE FINITE-STATE-MACHINE AND COMPUTER READABLE MEDIA

BACKGROUND OF THE INVENTION

1. Field of the Invention

The embodiments disclosed in this present invention relate to a finite state machine method, and more particularly, to an Operating-Mode Finite-State-Machine (OPFSM) method corresponding to a global finite-state-machine (FSM) of an automotive Ethernet standard, and associated computer readable media.

2. Description of the Prior Art

The modern automobile industry regards Ethernet as a basic architecture for new generation automotive internet. Ethernet has a high bandwidth which can satisfy application requests such as novel driver assistant, information and entertainment.

The automotive industry has recently focused on aspects such as low manufacturing cost and durability. In the past, when a factory used a Controller Area Network (CAN) or FlexRay to perform communication, an OPFAM needed to be installed in the physical layer of each bottom layer product, for receiving an access control or power-saving control etc. from a top layer controller, and comprehensively defining and describing the corresponding behavior and process of the bottom layer product and the top layer controller under various situations.

In the automotive Ethernet standard (e.g. BR-PHY standard), however, there is no clear definition for the global FSM (only some requirements from system manufacturers) or for advance operations such as selective wakeup and global wakeup. Therefore, a mechanism similar to the previous OPFSM is needed for supporting different wakeup mechanism as well as being compliant with the automotive Ethernet standard (e.g. BR-PHY standard), in order to simplify the complexity for the top layer while also corresponding to the previous global FSM.

SUMMARY OF THE INVENTION

One of the objectives of the present invention is to provide an OPFSM method corresponding to the global FSM, and an associated computer readable media, to address the above-mentioned technical problems of the prior art.

According to an exemplary embodiment, a control method applied to an OPFSM is disclosed, wherein the OPFSM is arranged for deciding the behavior of a first port of an apparatus, and the control method comprises: when the state of the OPFSM is a first local state and a wakeup request bit is configured to be a first logic value, controlling the OPFSM to enter a second local state from the first local state, and controlling the first port to transmit a signal with a wakeup pattern to a link partner of the first port.

According to an exemplary embodiment, a computer readable media storing a program code is disclosed. The following steps are executed to control an OPFSM as long as the program code is executed by a processor, wherein the OPFSM is arranged for deciding the behavior of a first port of an apparatus. The steps executed by the computer readable media comprise: when the state of the OPFSM is a first local state and a wakeup request bit is configured to be a first logic value, controlling the OPFSM to enter a second local state from the first local state, and controlling the first port to transmit a signal with a wakeup pattern to a link partner of the first port.

The OPFSM of the present invention can correspond to the global FSM defined by the automotive Ethernet standard, and can perform some operating mechanisms in advance such as selective wakeup, global wakeup via activation line or global wakeup via Ethernet cable, which considerably adds to the flexibility of the system.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
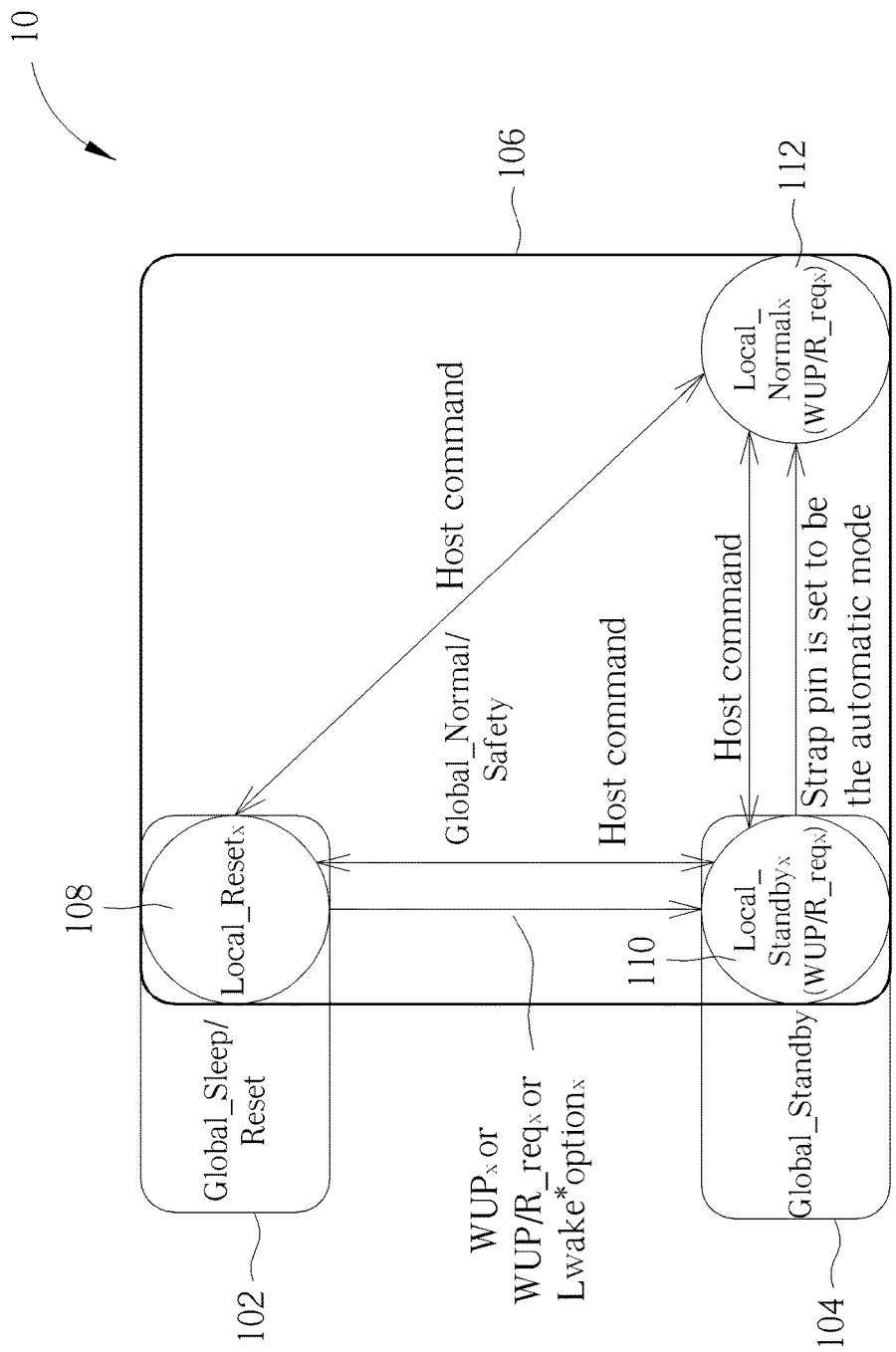
FIG. 1 is a diagram illustrating an OPFSM according to an embodiment of the present invention.

FIG. 1 is a diagram illustrating an OPFSM according to an embodiment of the present invention. An OPFSM 100 in this embodiment is applied in a product corresponding to the automotive Ethernet standard (e.g. BR-PHY standard) where the product has five physical layers (i.e. five ports), but this is not a limitation of the present invention. OPFSM 100 does not exclude being applied in related and similar standards/protocol of the identical or similar fields. In this embodiment, OPFSM100 corresponds to global FSM defined by the automotive Ethernet standard; more specifically, three simultaneous states of the global FSM which are shown in FIG. 1: a first global state (Global_Sleep/Reset 102), a second state (Global_Standby 104) and a third global state (Global_Normal/Safety 106); and three states of the OPFSM 100: a first local state (Local_Reset 108), a second local state (Local_Standby 110) and a third local state (Local_Normal 112). It should be noted that the global FSM defined by the automotive Ethernet standard is not limited to only comprise the first global state (Global_Sleep/Reset 102), the second global state (Global_Standby 104) and the third global state (Global_Normal/Safety 106) as described above. Only a portion of states related to the present invention are depicted here.

When the OPFSM 100 is located in the first state Local_Reset 108, the state of the corresponding global FSM can be the first global state Global_Sleep/Reset 102 or the third global state Global_Normal/Safety 106; when the OPFSM 100 is located in the second state Local_Standby 110, the state of the corresponding global FSM can be the second global state Global_Standby 104 or the third global state Global_Normal/Safety 106; when the OPFSM 100 is located in the third state Local_Normal 112, the state of the corresponding global FSM can be the third global state Global_Normal/Safety 106 only. Compared with the OPFSM 100, the global FSM has higher priority, which means: when the global FSM is controlled to enter the first global state Global_Sleep/Reset 102, the OPFSM 100 enters the first local state Local_Reset 108; when the global FSM is controlled to enter the second global state Global_Standby 104, the OPFSM 100 enters the second local state Local_Standby 110; and when the global FSM is controlled to enter the third global state Global_Normal/Safety 106, the OPFSM 100 can decide its state from amongst the first local state Local_Reset 108, the second local state Local_standby 110 and the third local state Local_Normal 112. For example, the state between the first local state Local_Reset 108, the second local state Local_standby 110 and the third local state Local_Normal 112 can be changed according to a host command issued by a top layer control unit.

For a single physical layer (e.g. single port) product, the OPFSM 100 is arranged for controlling the operation of the physical layer. For multiple physical layers (e.g. five ports automotive Ethernet standard product in this embodiment) product, each physical layer needs its own OPFSM 100 to control its own respective operation. The OPFSM 100 of the present invention can correspond to single/non-single physical layer product. Furthermore, the first local state Local_Reset 108 corresponds to the save-power mode of the first global state Global_Sleep/Reset 102 and, in a situation where each of the multiple physical layers has its own OPFSM 100 as described above so a partial network mechanism can be achieved (i.e. in the five ports automotive Ethernet standard product in this embodiment, when the state of the global FSM is the third global state Global_Normal/Safety 106), each physical layer can control the product according to the current status to make a portion of ports be located in the first local state Local_Reset 108 and the other ports not located in the first local state Local_Reset 108.

When the state of the global FSM of the five ports automotive Ethernet standard product of this embodiment is located in the third global state Global_Normal/Safety 106, and the OPFSM of the Xth port is located in the first local state Local_Reset 108 (X can be any integer from 0 to 4 representing the number of each port), if the Xth port receives the wakeup pattern (WUP), i.e. $WUP_x=1$, a wakeup request bit $QUP/R\_req_x$ of the Xth port changes to 1 from 0, or an activation line signal Lwake of the five ports automotive Ethernet standard product of this embodiment is configured to be 1, and a predetermined option of the Xth port is 1, the corresponding OPFSM 100 of the Xth port enters the second local state Local_Standby 110 from the first local state Local_Reset 108. It should be noted that the top layer control unit can command the OPFSM of the Xth to change its state between the first local state Local_Reset 108, the second local state Local_standby 110 and the third local state Local_Normal 112 via issuing the host command.

For example, when the predetermined options of each port of the five ports automotive Ethernet standard product of this embodiment are all set to be 1, as long as the activation line signal Lwake changes to 1 from 0, each port is woken so the system can be woken up quickly. The above-mentioned wakeup pattern can have different patterns according to the standard/specification, e.g. the wakeup pattern defined by the automotive Ethernet standard here. In addition, the wakeup request bit $WUP/R\_req_x$ is designed for each port of the five ports automotive Ethernet standard product of this embodiment, wherein when the wakeup request bit $WUP/R\_req_x$ changes to 1 from 0, the wakeup pattern is sent to the link partner if the corresponding Xth port is located in the second local state Local_standby 110; and a wakeup request (WUR) is encoded in an idle code and sent to the link partner if the corresponding Xth port is located in the third local state Local_Normal 112, wherein the wakeup request bits $WUP/R\_req_{0-4}$ corresponding to the $0^{th}$ port to the fourth port can be represented by the following equations (1) to (5).

$$WUP/R\_req_0 = \left(\left(\begin{array}{c}(WUP_1 \text{ or } WUR_1)*Selective_{10}\\ \text{or} \\ (WUP_2 \text{ or } WUR_2)*Selective_{20} \\ \text{or} \\ (WUP_3 \text{ or } WUR_3)*Selective_{30} \\ \text{or} \\ (WUP_4 \text{ or } WUR_4)*Selective_{40}\end{array}\right) \underbrace{\begin{array}{c} \text{or } en\_WUP/R_0 \\ \text{or} \\ L_{wake}*Lw2Rw_0\end{array}}_{Gate\_WUP/R_0}\right) * \quad (1)$$

$$WUP/R\_req_1 = \left(\left(\begin{array}{c}(WUP_0 \text{ or } WUR_0)*Selective_{01}\\ \text{or} \\ (WUP_2 \text{ or } WUR_2)*Selective_{21} \\ \text{or} \\ (WUP_3 \text{ or } WUR_3)*Selective_{31} \\ \text{or} \\ (WUP_4 \text{ or } WUR_4)*Selective_{41}\end{array}\right) \underbrace{\begin{array}{c} \text{or } en\_WUP/R_1 \\ \text{or} \\ L_{wake}*Lw2Rw_1\end{array}}_{Gate\_WUP/R_1}\right) * \quad (2)$$

$$WUP/R\_req_2 = \left(\left(\begin{array}{c}(WUP_0 \text{ or } WUR_0)*Selective_{02}\\ \text{or} \\ (WUP_1 \text{ or } WUR_1)*Selective_{12} \\ \text{or} \\ (WUP_3 \text{ or } WUR_3)*Selective_{32} \\ \text{or} \\ (WUP_4 \text{ or } WUR_4)*Selective_{42}\end{array}\right) \underbrace{\begin{array}{c} \text{or } en\_WUP/R_2 \\ \text{or} \\ L_{wake}*Lw2Rw_2\end{array}}_{Gate\_WUP/R_2}\right) * \quad (3)$$

-continued $$WUP/R\_req_3 = \begin{Bmatrix} (WUP_0 \text{ or } WUR_0)*\text{Selective}_{03} \\ \text{or} \\ (WUP_1 \text{ or } WUR_1)*\text{Selective}_{13} \\ \text{or} \\ (WUP_2 \text{ or } WUR_2)*\text{Selective}_{23} \\ \text{or} \\ (WUP_4 \text{ or } WUR_4)*\text{Selective}_{43} \end{Bmatrix} \text{ or } \begin{matrix} en\_WUP/R_3 \\ \text{or} \\ L_{wake}*Lw2Rw_3 \end{matrix} * \tag{4}$$

Gate_WUP/$R_3$ $$WUP/R\_req_4 = \begin{Bmatrix} (WUP_0 \text{ or } WUR_0)*\text{Selective}_{04} \\ \text{or} \\ (WUP_1 \text{ or } WUR_1)*\text{Selective}_{14} \\ \text{or} \\ (WUP_2 \text{ or } WUR_2)*\text{Selective}_{24} \\ \text{or} \\ (WUP_3 \text{ or } WUR_3)*\text{Selective}_{34} \end{Bmatrix} \text{ or } \begin{matrix} en\_WUP/R_4 \\ \text{or} \\ L_{wake}*Lw2Rw_4 \end{matrix} * \tag{5}$$

Gate_WUP/$R_4$

In equations (1) to (5), $WUP_x=1$ or $WUR_x=1$ means the Xth port receives the wakeup pattern or the wakeup request sent by the link partner from the Ethernet cable; a selective parameter $Selective_{xy}=1$ means when the Xth port receives the wakeup pattern or the wakeup request, it should be transferred to the Yth port to make the Yth port also send the wakeup pattern or the wakeup request to its link partner. A top layer setting wakeup request $en\_WUP/R_x$ is set by a command from the top layer control unit; an activation line enable parameter $Lw2Rw_x=1$ means if the activation line signal Lwake=1, the Xth port should send the wakeup pattern or the wakeup request to its link partner. The above-mentioned equations (1) to (5) are controlled by a main switch $Gate\_WUP/R_x$, wherein x and y are any different integer from 0 to 4.

When the state of the global FSM of the five ports automotive Ethernet standard product of this embodiment is located in the third global state Global_Normal/Safety 106 and the OPFSM of the Xth port is located in the second local state Local_Standby 110 (X can be any integer from 0 to 4 representing the number of each port of the five ports), at this point, the Xth port has not yet connected with the link partner. If a wakeup request bit of the Xth port $WUP/R\_req_x=1$, then the Xth port should send the wakeup pattern $WUP_x$ to the link partner immediately to achieve the goal of fast broadcast. In the second local state Local_standby 110, if a strap pin of the Xth port is set to be the automatic mode, then the Xth port enters the third local state Local_Normal 112 from the second local state Local_Standby 110 automatically after sending the wakeup pattern $WUP_x$; if the strap pin of the Xth port is set to be non-automatic mode, the Xth port decides whether to enter the third local state Local_Normal 112 from the second local state Local_Standby 110 or not according to the host command after sending the wakeup pattern $WUP_x$.

When the state of the global FSM of the five ports automotive Ethernet standard product of this embodiment is located in the third global state Global_Normal/Safety 106 and the OPFSM of the Xth port is located in the third local state Local_Normal 112 (X can be any integer from 0 to 4 representing the number of each port of the five ports), this means that the connection with the link partner is normal and a normal send-and-receive operation can be executed. At this time, if a wakeup request bit of the Xth port $WUP/R\_req_x=1$, then the Xth port can send the wakeup request to the link partner, where the link partner is also located in the standard send-and-receive mode. The wakeup request sent by the Xth port $WUR_x$ can be used to require the link partner to transfer this wakeup request via other ports. Therefore, the wakeup activation of the present invention is unrelated to the master/slave of the automotive Ethernet standard.

Figure 2:
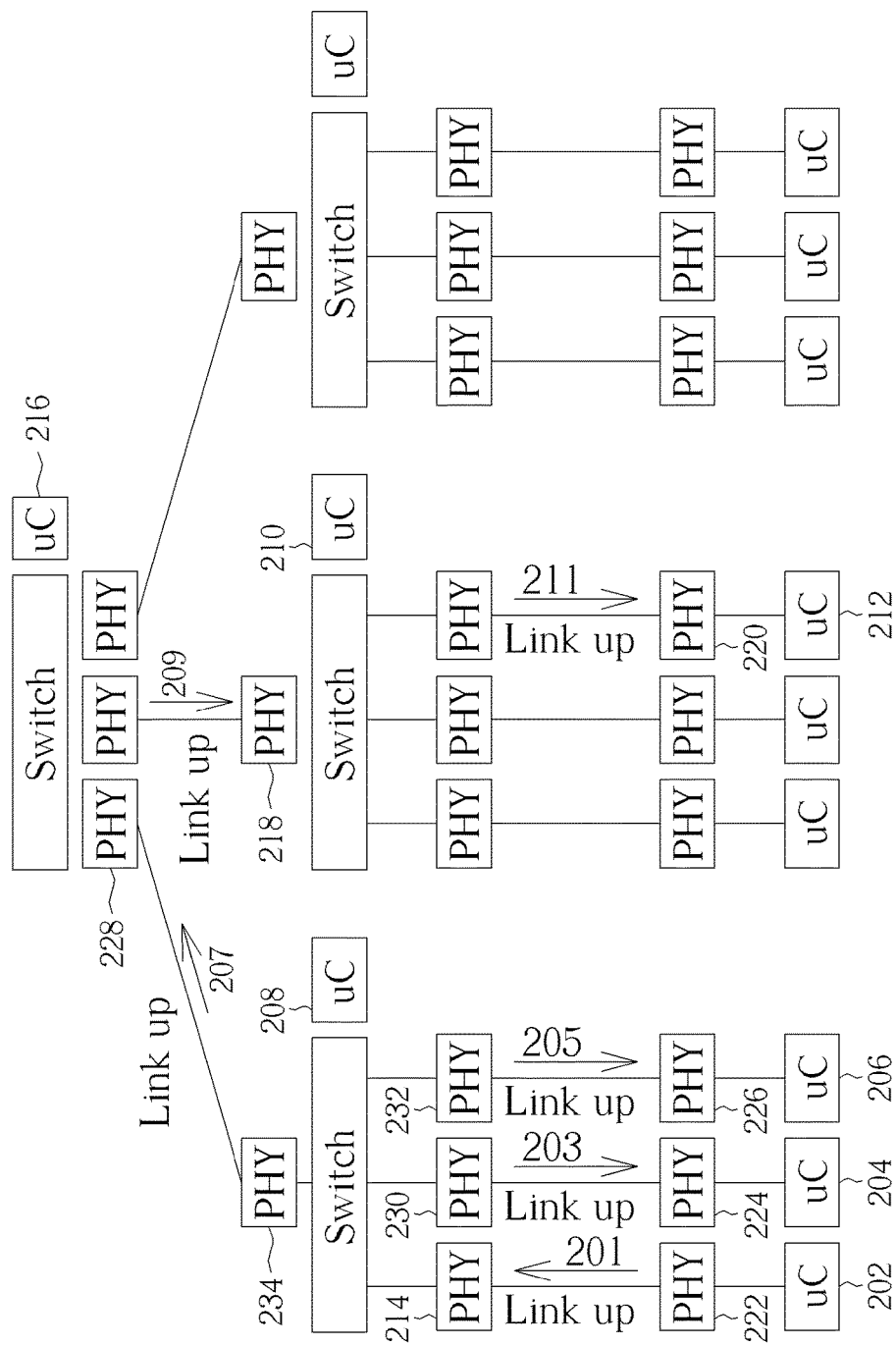
FIG. 2 is a diagram illustrating an OPFSM applied in selective wakeup mechanism according to an embodiment of the present invention.

FIG. 2 is a diagram illustrating an OPFSM applied in a selective wakeup mechanism according to an embodiment of the present invention. In this embodiment, the above-mentioned OPFSM 100 is applied in a system corresponding to the automotive Ethernet standard (e.g. BR-PHY standard), wherein the system comprises an automotive Ethernet standard product with nine single ports, three quadruple ports automotive Ethernet standard switch and a triple ports automotive Ethernet standard switch. In the selective wakeup mechanism, the selective parameters Selective of each FSM 100 in the automotive Ethernet standard system are all predetermined to be zero, and each strap pin is predetermined to be non-automatic mode. In addition, the predetermined options of the OPFSMs of each physical layer are predetermined to be zero and the main switch Gate_WUP/R is predetermined to be 1. When a micro controller (uC) 202 senses a specific situation and decides to wake up the micro controllers 204, 206, 208, 210 and 212, a physical layer 222 is requested to wake up another physical layer 214. After building a connection 201, the micro controller 202 and another micro controller 208 perform a handshake program to decide which port is controlled by the micro controller 208 before sending the wakeup request to the link partner. After the handshake program, the micro controller 208 wakes up the physical layers 224, 226 and 228 via setting the wakeup request parameters en_WUP/R of the physical layers 230, 232 and 234 respectively, and builds the connection 203, 205 and 207. Then, similarly, the micro controller 208 and another micro controller 216 perform a handshake program, and decide to wake up another physical layer 218 and build another connection 209. Then, the micro controller 216 and another micro controller 210 perform the handshake program again, and decide to wake up another physical layer 220 and build another connection 211.

Figure 3:
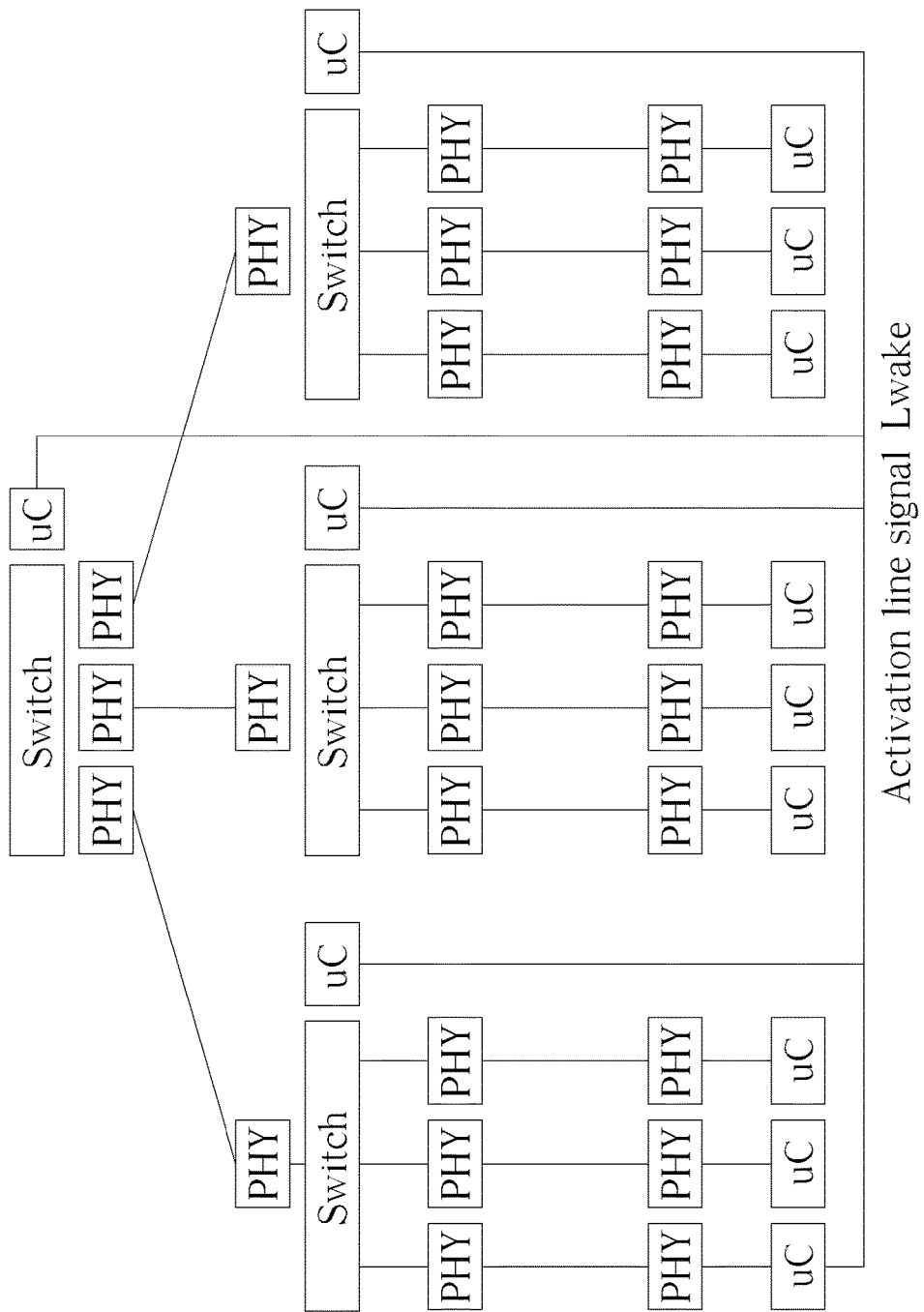
FIG. 3 is a diagram illustrating an OPFSM applied in global wakeup mechanism via activation line according to an embodiment of the present invention.

FIG. 3 is a diagram illustrating an OPFSM applied in a global wakeup mechanism via an activation line according to an embodiment of the present invention. In this embodiment, the above-mentioned OPFSM 100 is applied in a system corresponding to the automotive Ethernet standard (e.g. BR-PHY standard), wherein the system comprises an automotive Ethernet standard product with nine single ports, three quadruple ports automotive Ethernet standard switch and a triple ports automotive Ethernet standard switch. In the global wakeup mechanism via activation line, the selective parameters Selective of each FSM 100 in the automotive Ethernet standard system are all predetermined to be zero, and each strap pin is predetermined to be automatic mode. In addition, the predetermined options of the OPFSMs of each physical layer and the main switch Gate_WUP/R are predetermined to be 1. When any micro controller senses a specific situation and decides to wake up another specific micro controller, the activation line signal Lwake can be set to be 1 directly. In this way, the whole system can be woken at once instead of sending an additional wakeup pattern of the wakeup request.

Figure 4:
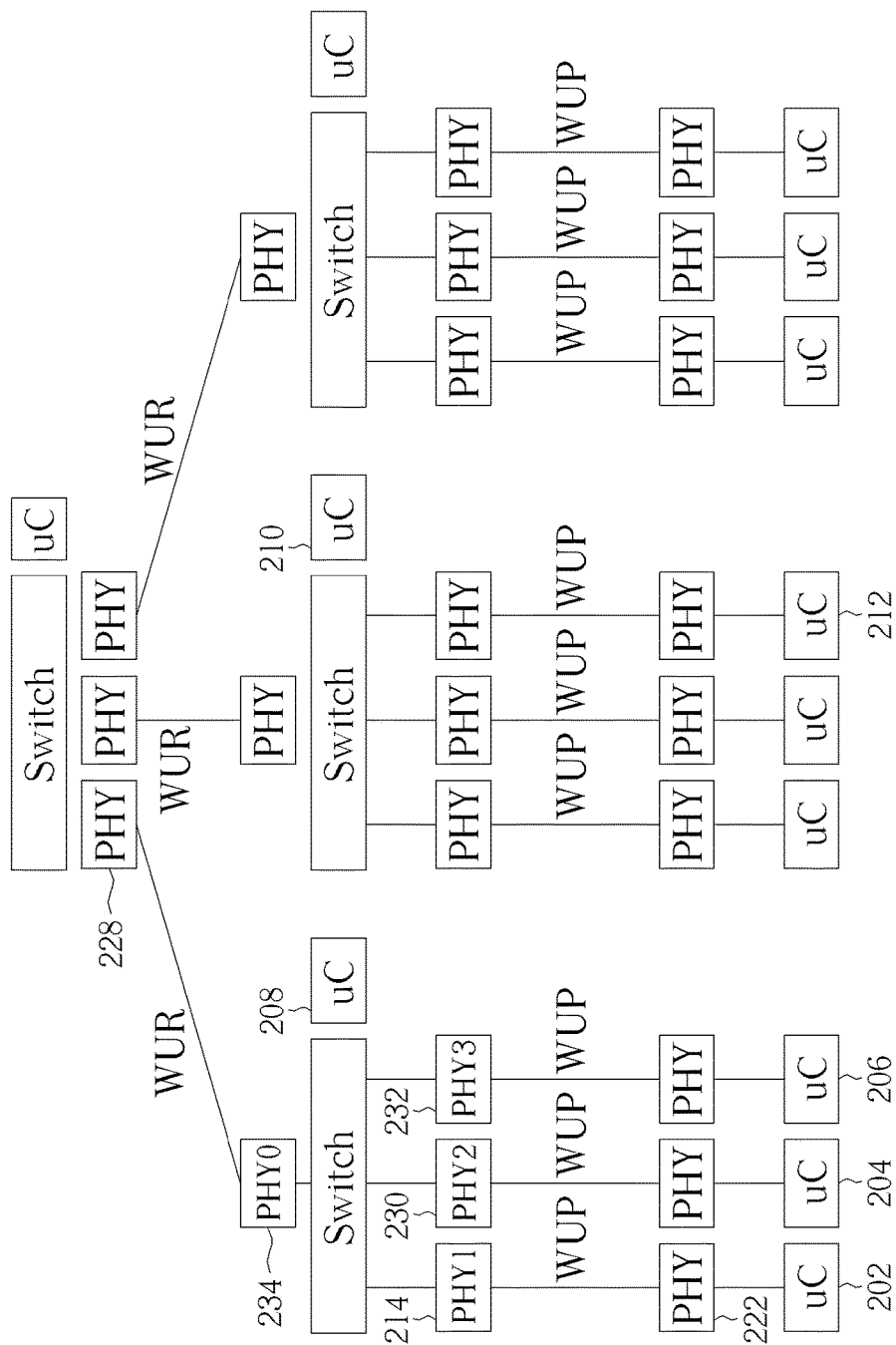
FIG. 4 is a diagram illustrating an OPFSM applied in global wakeup mechanism via Ethernet cable according to an embodiment of the present invention.

FIG. 4 is a diagram illustrating an OPFSM applied in a global wakeup mechanism via Ethernet cable according to an embodiment of the present invention. In this embodiment, the above-mentioned OPFSM 100 is applied in a system corresponding to the automotive Ethernet standard (e.g. BR-PHY standard), wherein the system comprises an automotive Ethernet standard product with nine single ports, three quadruple ports automotive Ethernet standard switch and a triple ports automotive Ethernet standard switch. In the global wakeup mechanism via Ethernet cable, the selective parameters Selective of each FSM 100 in the automotive Ethernet standard system and the main switch Gate_WUP/R are all predetermined to be 1, and the predetermined options of the OPFSMs of each physical layer are predetermined to be zero. When a micro controller 202 senses a specific situation and decides to wake up the micro controllers 204, 206, 208, 210 and 212, a physical layer 222 is required to wake up another physical layer 214, and the wakeup request bits WUP/R_req of the physical layers 230, 232 and 234 change to 1 from 0 before building a connection. Therefore, the physical layers 230, 232 and 234 can send the wakeup pattern or the wakeup request immediately, and the whole system can be woken fast.

Figure 5A:
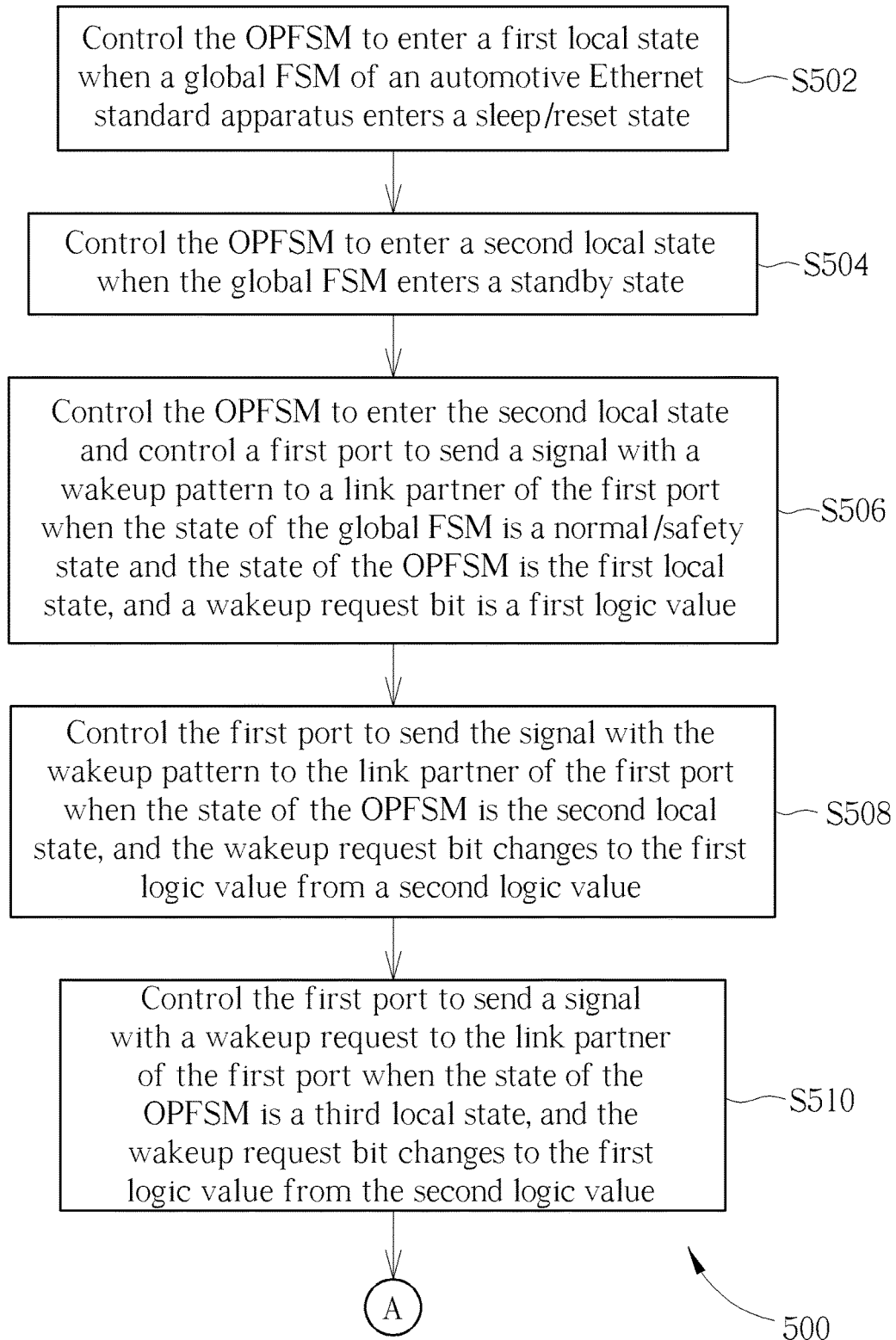
FIG. 5A is flowchart illustrating a control method applied in an OPFSM according to an exemplary embodiment of the present invention.
Figure 5B:
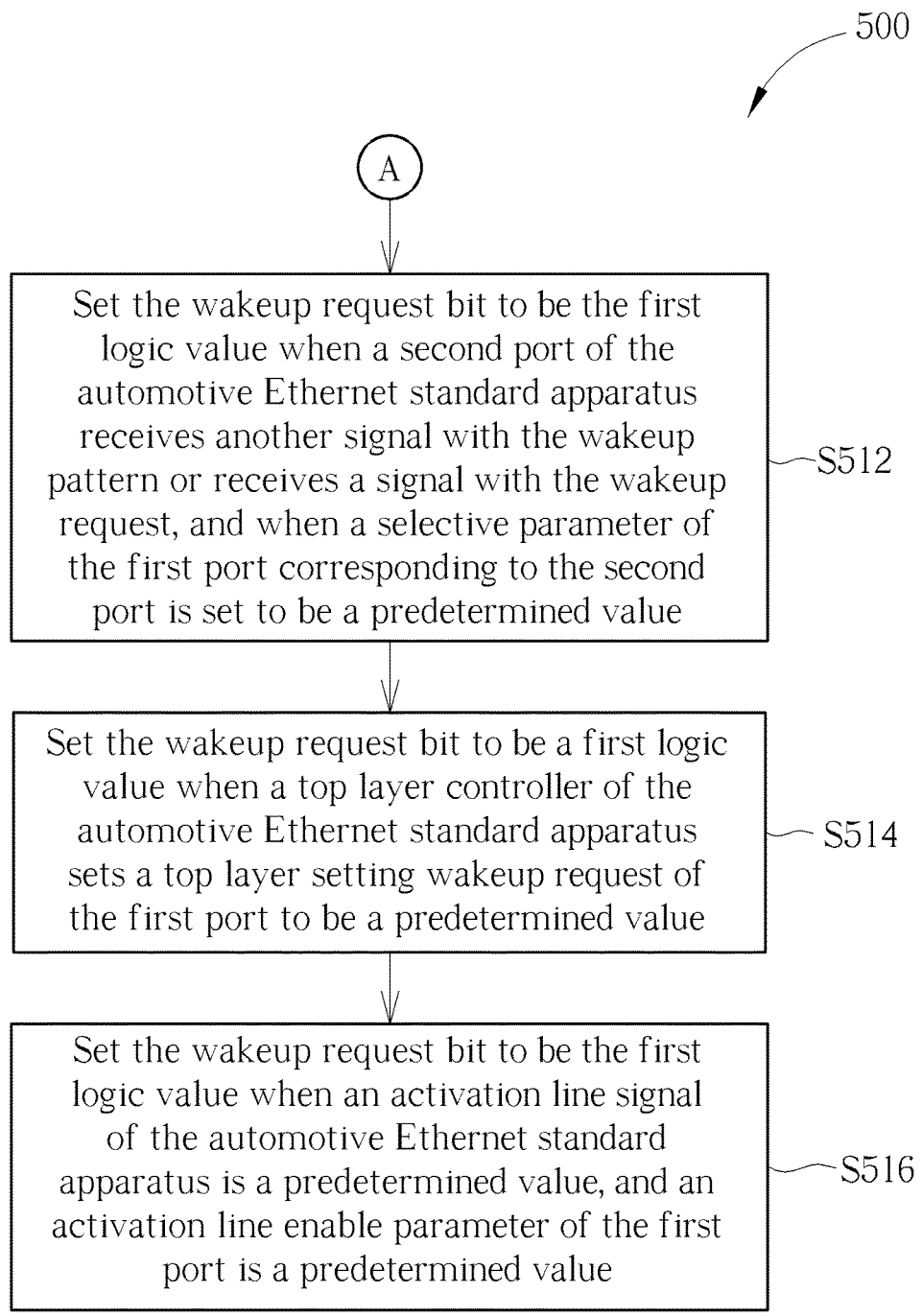
FIG. 5B is a follow-up flowchart of FIG. 5A

FIG. 5A to FIG. 5B are flowcharts illustrating a control method applied in an OPFSM according to an exemplary embodiment of the present invention. Provided that substantially the same result is achieved, the steps of the flowcharts shown in FIG. 5A and FIG. 5B need not be in the exact order shown and need not be contiguous; that is, other steps can be intermediate. In addition, some steps of FIG. 5A and FIG. 5B can be changed or omitted according to different embodiments or designs. The steps of the control method 500 applied in an OPFSM are described as follows.

Step 502: control the OPFSM to enter a first local state when a global FSM of an automotive Ethernet standard apparatus enters a sleep/reset state;

Step 504: control the OPFSM to enter a second local state when the global FSM enters a standby state;

Step 506: control the OPFSM to enter the second local state and control a first port to send a signal with a wakeup pattern to a link partner of the first port when the state of the global FSM is a normal/safety state and the state of the OPFSM is the first local state, and a wakeup request bit is a first logic value;

Step 508: control the first port to send the signal with the wakeup pattern to the link partner of the first port when the state of the OPFSM is the second local state, and the wakeup request bit changes to the first logic value from a second logic value;

Step 510: control the first port to send a signal with a wakeup request to the link partner of the first port when the state of the OPFSM is a third local state, and the wakeup request bit changes to the first logic value from the second logic value;

Step 512: set the wakeup request bit to be the first logic value when a second port of the automotive Ethernet standard apparatus receives another signal with the wakeup pattern or receives a signal with the wakeup request, and when a selective parameter of the first port corresponding to the second port is set to be a predetermined value.

Step 514: set the wakeup request bit to be a first logic value when a top layer controller of the automotive Ethernet standard apparatus sets a top layer setting wakeup request of the first port to be a predetermined value; and Step 516: set the wakeup request bit to be the first logic value when an activation line signal of the automotive Ethernet standard apparatus is a predetermined value, and an activation line enable parameter of the first port is a predetermined value.

Figure 6:
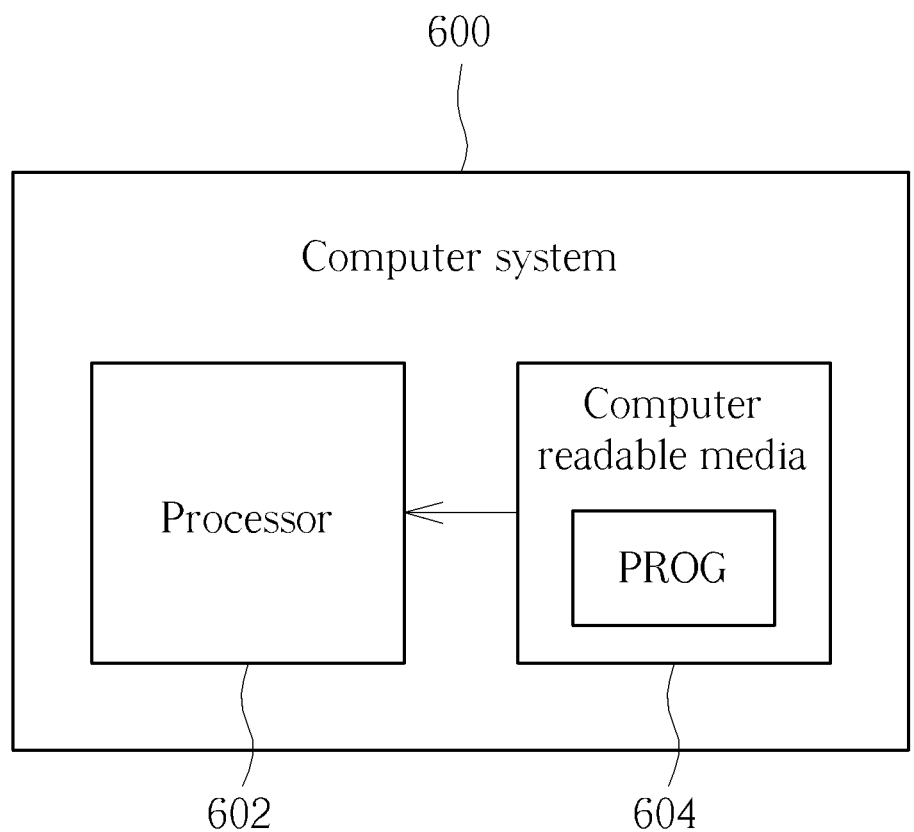
FIG. 6 is a diagram illustrating a computer system.

FIG. 6 is a diagram illustrating a computer system 600. The computer system 600 comprises a processor 602 and a computer readable media 604. For example, the computer system 600 can be a personal computer, and the computer readable media 604 can be any storage apparatus with a data storing function in the personal computer such as a volatile memory, non-volatile memory, hard disk or disc. In this embodiment, a program code PROG is stored in the computer readable media 604; therefore, when the program code PROG is loaded and executed by the processor 602, the program code PROG makes the processor 602 execute the steps Step 502 to Step 516 shown in FIG. 5 to control an OPFSM, wherein the OPFSM is arranged for deciding the behavior of a first port of an automotive Ethernet standard apparatus. Because one skilled in the art should understand the operation of the program code PROG after reading the content of the above paragraphs, the explanation is omitted here for brevity. The above-described concept of the present invention can be implemented in any integrated circuit by semiconductors. For example, the present invention can be implemented in a single integrated circuit design, or a supplication-specific integrated circuit and/or any other subsystem.

The present invention can be implemented in any suitable form comprising hardware, software, firmware or any combination of these. At least part of the present invention can be selectively implemented to be computer software operated in one or a plurality of data processors and/or in a digital signal processor or configurable module element (e.g. FPGA). Therefore, the elements and components of the embodiments of the present invention can be physically, functionally and logically implemented in any suitable form. In practice, the function of the present invention can be implemented in a single unit, a plurality of units, or can be a part of other functional units.

Although the present invention is explained using particular embodiments, the present invention is not limited to the specific form described in the specification. The scope of the present invention is only limited by the claims. In addition, although the characteristics of the present invention are described by combining specific embodiments, one skilled in this art should understand that a variety of characteristics can be combined according to the present invention. In the claims, the technical term "comprise" does not exclude the existence of other elements or steps.

In addition, the order of the features in the claims does not mean a specific order that must be followed, and the order of steps in the method claims does not mean these steps must be followed in exactly this order. In addition, a single citing does not exclude plurality. Therefore, words like "a", "first", "second" do not exclude plurality.

The OPFSM of the present invention can correspond to the global FSM defined by the automotive Ethernet standard, which can execute a plurality of advance operating mechanism such as selective wakeup, global wakeup via activation line or global wakeup via Ethernet cable, which considerably increases the flexibility of the system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method comprising:
controlling an Operating-Mode Finite-State-Machine (OPFSM) to enter a second local state from a first local state, wherein the OPFSM is arranged to decide a behavior of a first port of an apparatus; and
controlling the first port to send a signal with a wakeup pattern to a link partner of the first port when the state of the OPFSM is the first local state, and a wakeup request bit is a first local value, wherein the wakeup pattern is configured to wake up the link partner of the first port.

2. The control method of claim 1, further comprising:
controlling the first port to send the signal with the wakeup pattern to the link partner of the first port when the state of the OPFSM is the second local state, and the wakeup request bit is changed to the first logic value from a second logic value.

3. The control method of claim 1, further comprising:
controlling the first port to send a signal of a wakeup request to the link partner of the first port when the state of the OPFSM is a third local state, and the wakeup request bit is changed to the first logic value from a second logic value.

4. The control method of claim 1, further comprising:
setting the wakeup request bit to be the first logic value when a second port of the apparatus receives another signal with the wakeup pattern.

5. The control method of claim 4, wherein the step of setting the wakeup request bit to be the first logic value when the second port of the apparatus receives another signal with the wakeup pattern comprises:
setting the wakeup request bit to be the first logic value when the second port of the apparatus receives another signal with the wakeup pattern, and a selective parameter of the first port corresponding to the second port is set to be a predetermined value.

6. The control method of claim 1, further comprising:
setting the wakeup request bit to be the first logic value when the second port of the apparatus receives a signal with a wakeup request.

7. The control method of claim 6, wherein the step of setting the wakeup request bit to be the first logic value when the second port of the apparatus receives a signal with a wakeup request comprises:
setting the wakeup request bit to be the first logic value when the second port of the apparatus receives the signal with the wakeup request, and a selective parameter of the second port corresponding to the first port is set to be a predetermined parameter.

8. The control method of claim 1, further comprising:
setting the wakeup request bit to be the first logic value when a top layer controller of the apparatus sets a top layer setting wakeup request of the first port to be a predetermined value.

9. The control method of claim 1, further comprising:
setting the wakeup request bit to be the first logic value when an activation line signal of the apparatus is a predetermined value.

10. The control method of claim 9, wherein the step of setting the wakeup request bit to be the first logic value when an activation line signal of the apparatus is a predetermined value comprises:
setting the wakeup request bit to be the first logic value when the activation line enable signal is the predetermined value, and an activation line enable parameter of the first port is a predetermined parameter.

11. The control method of claim 1, further comprising:
controlling the OPFSM to enter the first local state when a global FSM of the apparatus enters a sleep/reset state; and
controlling the OPFSM to enter the second local state when the global FSM enters a standby state.

12. The control method of claim 11, wherein the steps of controlling the OPFSM to enter the second local state and controlling the first port to send a signal with the wakeup pattern to the link partner of the first port when the state of the OPFSM is the first local state and the wakeup request bit is the first logic value comprise:
controlling the OPFSM to enter the second local state and controlling the first port to send a signal with the wakeup pattern to the link partner of the first port when the state of the global FSM is a normal/safety state, the state of the OPFSM is the first local state, and the wakeup request bit is the first logic value.

13. The control method of claim 1, wherein the apparatus corresponds to an automotive Ethernet standard.

14. A non-transitory computer readable media storing a program code which, when executed by a controller, controls an Operating-Mode Finite-State-Machine (OPFSM) arranged for deciding a behavior of a first port of an apparatus to perform the following steps:
controlling the OPFSM to enter a first local state and controlling the first port to send a signal with a wakeup pattern to a link partner of the first port when the state of the OPFSM is a first local state, and a wakeup request bit is a first logic value, wherein the wakeup pattern is configured to wake up the link partner of the first port.

15. The non-transitory computer readable media of claim 14, further executing the following steps:
controlling the first port to send the signal with the wakeup pattern to the link partner of the first port when the state of the OPFSM is the second local state, and the wakeup request bit is changed to the first logic value from a second logic value.

16. The non-transitory computer readable media of claim 14, further executing the following steps:
controlling the first port to send a signal of a wakeup request to the link partner of the first port when the state of the OPFSM is a third local state, and the wakeup request bit is changed to the first logic value from a second logic value.

17. The non-transitory computer readable media of claim 14, further executing the following steps:
setting the wakeup request bit to be the first logic value when a second port of the apparatus receives another signal with the wakeup pattern.

18. The non-transitory computer readable media of claim 17, wherein the step of setting the wakeup request bit to be the first logic value when the second port of the apparatus receives another signal with the wakeup pattern comprises:
setting the wakeup request bit to be the first logic value when the second port of the apparatus receives another signal with the wakeup pattern, and a selective parameter of the first port corresponding to the second port is set to be a predetermined value.

19. The non-transitory computer readable media of claim 14, further executing the following steps:
setting the wakeup request bit to be the first logic value when the second port of the apparatus receives a signal with a wakeup request.

20. The non-transitory computer readable media of claim 19, wherein the step of setting the wakeup request bit to be the first logic value when the second port of the apparatus receives a signal with a wakeup request comprises:
  setting the wakeup request bit to be the first logic value when the second port of the apparatus receives the signal with the wakeup request, and a selective parameter of the second port corresponding to the first port is set to be a predetermined parameter.

\* \* \* \* \*